United States Patent
Ho et al.

(10) Patent No.: US 12,356,068 B2
(45) Date of Patent: *Jul. 8, 2025

(54) EVENT LENGTH DEPENDENT COOL-OFF FOR CAMERA EVENT BASED RECORDINGS

(71) Applicant: Google LLC, Mountain View, CA (US)

(72) Inventors: Dietrich Ho, Mountain View, CA (US); Aditya Ghadiali, Mountain View, CA (US); Arun Raghupathy, Pleasanton, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/758,737

(22) Filed: Jun. 28, 2024

(65) Prior Publication Data

US 2024/0357230 A1     Oct. 24, 2024

Related U.S. Application Data (63) Continuation of application No. 17/997,618, filed as application No. PCT/US2021/021749 on Mar. 10, 2021, now Pat. No. 12,058,437.

(60) Provisional application No. 63/024,952, filed on May 14, 2020.

(51) Int. Cl.
*H04N 23/65* (2023.01)
*H04N 23/61* (2023.01)
*H04N 23/667* (2023.01)

(52) U.S. Cl.
CPC ........... *H04N 23/651* (2023.01); *H04N 23/61* (2023.01); *H04N 23/667* (2023.01)

(58) Field of Classification Search
CPC .... H04N 23/651; H04N 23/61; H04N 23/667; G06F 1/3206; G06F 1/206
See application file for complete search history.

(56) References Cited

U.S. PATENT DOCUMENTS

| 9,906,722 B1 | 2/2018 | Gigot |
| 12,058,437 B2 * | 8/2024 | Ho ........................ H04N 23/667 |
| 2009/0009617 A1 | 1/2009 | Ito et al. |
| 2017/0019577 A1 | 1/2017 | Tan et al. |
| 2017/0272706 A1 | 9/2017 | Jeong |
| 2018/0192009 A1 | 7/2018 | Jeong |

(Continued)

FOREIGN PATENT DOCUMENTS

WO     2021230961     11/2021

OTHER PUBLICATIONS

"Corrected Non-Final Office Action", U.S. Appl. No. 17/997,618, filed Mar. 6, 2024, 8 pages.

(Continued)

*Primary Examiner* — Timothy J Henn
(74) *Attorney, Agent, or Firm* — Colby Nipper PLLC (57) ABSTRACT

A method including, at a camera, detecting motion in a field of view of the camera using a motion sensor, initiating processing of video data corresponding to the field of view in which the motion was detected, ceasing the processing after a first time duration, and determining a cool-off period for the motion sensor, the cool-off period having a second time duration based on the first time duration during which the camera does not detect motion using the motion sensor.

20 Claims, 6 Drawing Sheets

(56) References Cited

U.S. PATENT DOCUMENTS

2019/0138795 A1   5/2019   Vaidya
2023/0217100 A1   7/2023   Ho et al.

OTHER PUBLICATIONS

"International Preliminary Report on Patentability", Application No. PCT/US2021/021749, Nov. 15, 2022, 8 pages.
"International Search Report and Written Opinion", Application No. PCT/US2021/021749, Jun. 25, 2021, 11 pages.
"Non-Final Office Action", U.S. Appl. No. 17/997,618, filed Dec. 28, 2023, 8 pages.
"Notice of Allowance", U.S. Appl. No. 17/997,618, filed Apr. 18, 2024, 7 pages.

* cited by examiner

EVENT LENGTH DEPENDENT COOL-OFF FOR CAMERA EVENT BASED RECORDINGS

CROSS-REFERENCE TO RELATED APPLICATION(S)

This application is a continuation of and claims priority to U.S. Non-Provisional patent application Ser. No. 17/997,618, filed Oct. 31, 2022, which in turn is a national stage entry of International Application No. PCT/US2021/021749, filed Mar. 10, 2021, which claims the benefit of U.S. Provisional Application No. 63/024,952, filed May 14, 2020, the disclosures of which are incorporated herein by reference in their entirety.

TECHNICAL FIELD

This relates generally to motion detection and video processing at a camera device, including but not limited to managing the effects of heat-producing components on heat-sensitive components of a camera device.

BACKGROUND

A passive infrared (PIR) sensor measures infrared light radiating from objects in its field of view. A PIR sensor can detect motion by detecting changes in the amount of infrared radiation impinging upon it. When an object, such as a person, passes in front of a background, such as a portion of an environment proximate to the sensor, the temperature at that point in the sensor's field of view rises from background temperature to body temperature. The resulting change in the incoming infrared radiation triggers a detection of motion.

PIR-based motion detection is useful in low-power applications, such as battery powered camera devices, because PIR sensors require relatively low levels of power to operate. However, since PIR sensors are, by design, sensitive to infrared radiation, PIR sensors can be extremely sensitive to nearby heat sources. Some types of electronic components in camera devices generate heat when functioning. This heat may spread to the PIR sensor and increase its sensitivity, and as a result, the PIR sensor may be more likely to miss or inaccurately report a motion event.

SUMMARY

This disclosure describes systems and methods for adaptively restricting usage of heat sensitive motion sensors (e.g., PIR sensors) and/or data generated by such sensors in devices comprising heat generating components. Such adaptive restrictions serve to balance the trade-off between inaccurate motion detection data (e.g., false positives when the motion sensor is too hot) and missed detections (e.g., false negatives when the motion sensor is not being used during a cool-off period).

In one aspect, some implementations include a battery-powered camera device and/or a method performed at a battery-powered camera device. The camera device detects motion in a field of view of the camera device using a motion sensor (e.g., a PIR sensor). Upon detection of motion in the field of view, the camera device processes video data corresponding to the field of view in which the motion was detected (e.g., using a processor and an image sensor). The on-camera processing continues for a first time duration, during which various components of the camera device generate heat. When the camera device ceases the on-camera processing of the video data at the end of the first time duration, the camera device determines a cool-off period for the motion sensor, during which the camera device does not perform motion detection using the motion sensor. The cool-off period lasts for a second time duration, and the length of the second time duration is determined based on the length of the first time duration. In other words, the longer the camera device processes the video data using heat-generating processing components (the first time duration), the longer the cool-off period (the second time duration) during which the motion sensor, or data generated by the motion sensor, is not used. Likewise, the shorter the camera device processes the video data using heat-generating processing components (the first time duration), the shorter the cool-off period (the second time duration) during which the motion sensor, or data generated by the motion sensor, is not used.

Thus, systems and devices are provided for adaptively enabling low-power motion detection at a camera device in a way that ensures accurate results while reducing motion sensor recovery time. The implementations described herein prevent a motion sensor from being used while it is too hot to produce reliable motion detection results, but in an adaptive fashion that does not disable motion detection at the camera device for an amount of time longer than necessary.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

Like reference numerals refer to corresponding parts throughout the several views of the drawings.

DETAILED DESCRIPTION

Low-power event detection systems, such as battery powered cameras, conserve power by leaving certain high-power components in a low-power state until they are needed. For example, a battery powered camera may power down high-power image processing circuitry if there is nothing of interest in the camera's field of view. In order to determine if there is an object of interest in the camera's field of view, such a camera may use a low-power component to detect motion, such as a PIR motion sensor. Once motion is detected, the camera powers up its image processing circuitry in order to carry out more complicated object recognition processes. Such cameras may also make use of high-power communication circuitry to stream video data recorded by the image processing circuitry.

While motion sensors can function using relatively low amounts of power, some types of motion sensors, especially PIR sensors, can be sensitive to heat generated from other components in the camera device. More specifically, the aforementioned high-power processes (image processing and communication) generate heat when enabled. The longer these processes are enabled, the more heat they generate. This heat may spread to the motion sensor, which may introduce noise and make the motion sensor readings unreliable. This means that the motion sensor may be more likely to trigger inaccurate motion detections (false positives) shortly after a previous motion event has ended.

Disabling the motion sensor or disregarding data generated by the motion sensor after a previous motion event has concluded (e.g., after the camera has stopped recording and streaming video data) allows the motion sensor to cool off. As such, the camera device delays use of the motion sensor for motion detection until the motion sensor, or the environment proximate to the motion sensor, is cool enough for the motion sensor to perform at an expected level of accuracy. When the motion sensor is re-enabled (or when the motion data is no longer disregarded), the motion sensor can provide more accurate motion detections (fewer false positives). This disclosure refers to the length of time during which the motion sensor is disabled, during which motion data is disregarded, or during which use of the motion sensor is delayed, as a cool-off period. While cool-off periods allow for a decrease in false positives, motion detections cannot occur while the motion sensor is disabled (or while data from the motion sensor is disregarded), thereby increasing missed detections (false negatives). In order to balance the false positives caused by the motion sensor being too noisy/unreliable, and the false negatives caused by the motion sensor being disabled (or motion data being disregarded) during the cool-off period, the event detection systems and methods described herein utilize variable cool-off periods.

Event Detection System

Figure 1:
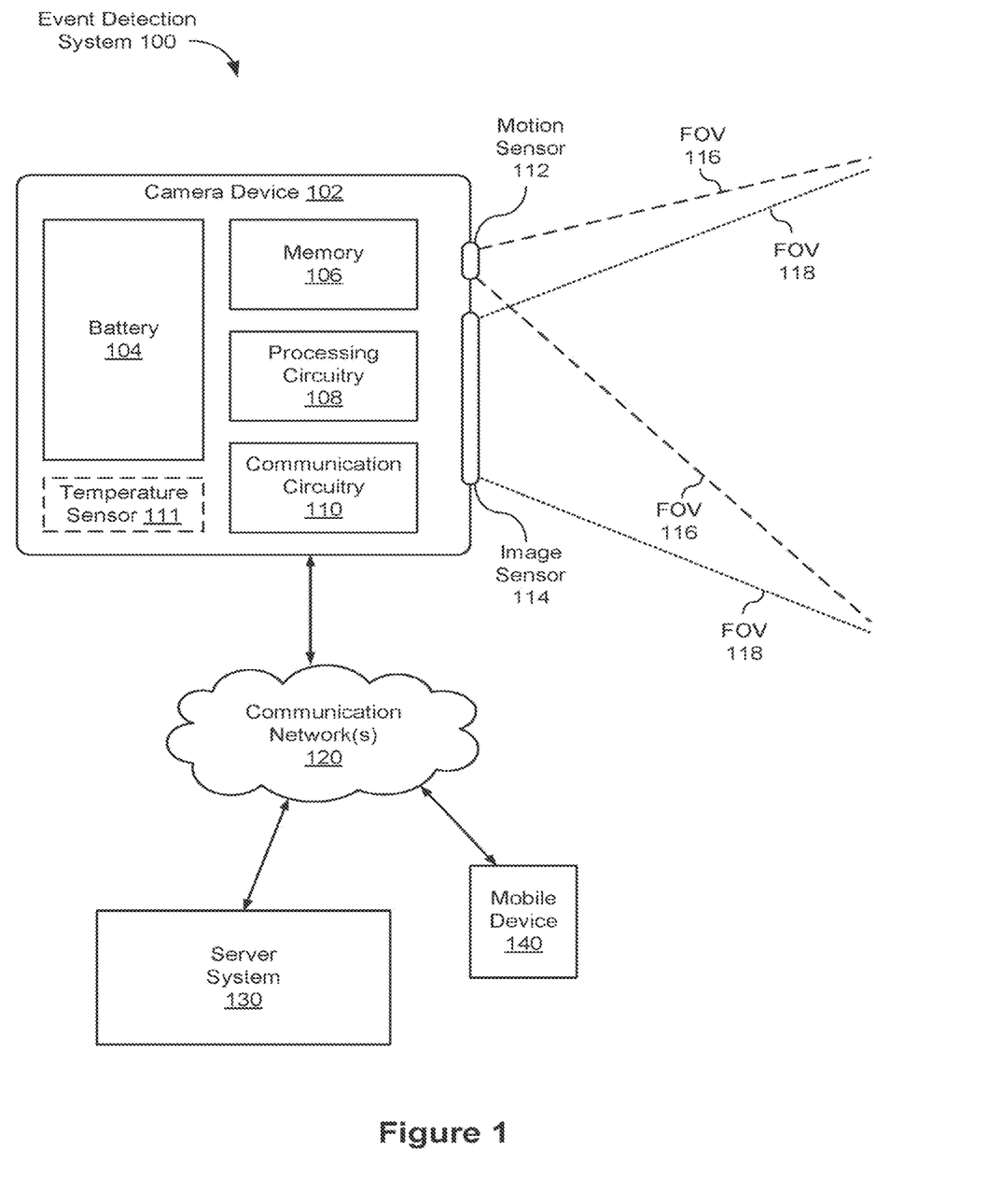
FIG. 1 is a diagram of an event detection system in accordance with some implementations.

FIG. 1 is a diagram of an event detection system 100 in accordance with some implementations. The event detection system 100 includes a camera device 102, one or more communication networks 120, a server system 130, and a mobile device 140. In other implementations, there may be a plurality of server systems 130, no server system 130, a plurality of mobile devices 140, no mobile devices 140, and/or no communication network(s) 120. For example, the camera device 102 may wirelessly stream video data to a server system 130 for storage or additional processing, and a user may access the video data using a mobile device 140 in communication with the server system 130. Alternatively, the camera device 102 may wirelessly stream video data to a mobile device 140. Alternatively, the camera device 102 may store video data locally without streaming it, making the video data available for retrieval at the camera device itself. Regardless of the implementation, the event detection system 100 includes at least (i) a low-power motion sensor 112, (ii) high-power image processing components, such as an image sensor 114 and processing circuitry 108, and (iii) a power source, such as a battery 104. In some implementations, the camera device 102 includes, or is locally networked with, a temperature sensor 111.

The motion sensor 112 requires an amount of power such that it can function for a period of time (e.g., at least a day, a week, a month, or longer) on power provided by the battery 104 without depleting the battery's power reserve to a level that compromises other functions of the camera device 102 that also rely on power provided by the battery 104. A component or a device requiring this amount of power to function is referred to herein as a low-power component or device. As a non-limiting example, some low-power motion sensors (e.g., PIR sensors) may draw only several milliwatts of power (e.g., up to 10 milliwatts).

The image sensor 114, elements of the processing circuitry 108 that are responsible for image processing, and the communication circuitry 110 require an amount of power such that keeping one or more of these components enabled indefinitely would deplete the battery's power reserve in a relatively short amount of time (e.g., less than an hour, less than a day, or less than a week). A component or a device requiring this amount of power is referred to herein as a high-power component or device. As a non-limiting example, pixel-based image processing using an image sensor may draw multiple watts of power (e.g., 5 watts). Such a power draw could deplete the battery in a battery powered camera within hours.

The memory 106 stores programs that, when executed by elements of the processing circuitry 108, perform one or more of the functions described below with reference to FIGS. 2A-5. The processing circuitry 108 includes one or more processors for executing the programs stored in the memory 106. More specifically, in some implementations, the processing circuitry 108 processes motion data from the motion sensor 112, processes image data from the image sensor 114, and determines whether to enable or disable any of the aforementioned components (or whether to disregard data generated by any of the aforementioned components). In some implementations, one or more of the processors included in the processing circuitry 108 may be a high-power processor, and thus may be disabled or kept in a low-power state along with the other high-power components until needed.

The motion sensor 112 has a field of view (FOV) 116 that extends from the camera device 102. If there is motion in the field of view 116, the motion sensor 112 detects the motion (sometimes referred to herein as a motion event), and communicates the detection to the processing circuitry 108. The image sensor 114 has a field of view 118 that extends from the camera device 102. Upon being enabled, the image sensor 114 senses image data in a portion of a scene that corresponds to the field of view 118 and communicates the image data to the processing circuitry 108 for analysis and/or video recording. One of the fields of view 116 and 118 may overlap entirely or partially with the other.

Upon detection of motion by the motion sensor 112 in the field of view 116, the camera device 102 enables elements of the processing circuitry 108 to analyze image data from the field of view 118 of the image sensor 114. If, as a result of this analysis, a person or object of interest is recognized in the field of view 118, the camera device 102 records video data captured by the image sensor 114 and stores the video data as an event and/or uploads the video data to a server system 130 or a mobile device 140 as an event. The recording of video data based on motion detection, person recognition, and/or object recognition is referred to herein as event-based recording.

Event Detection Scenario

Figure 2A:
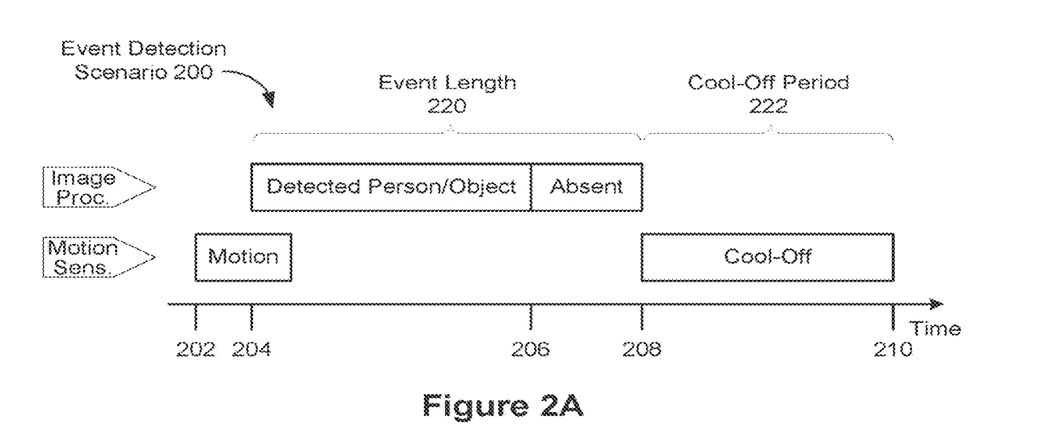
FIG. 2A is a diagram of an event detection scenario in accordance with some implementations.
Figure 2B:
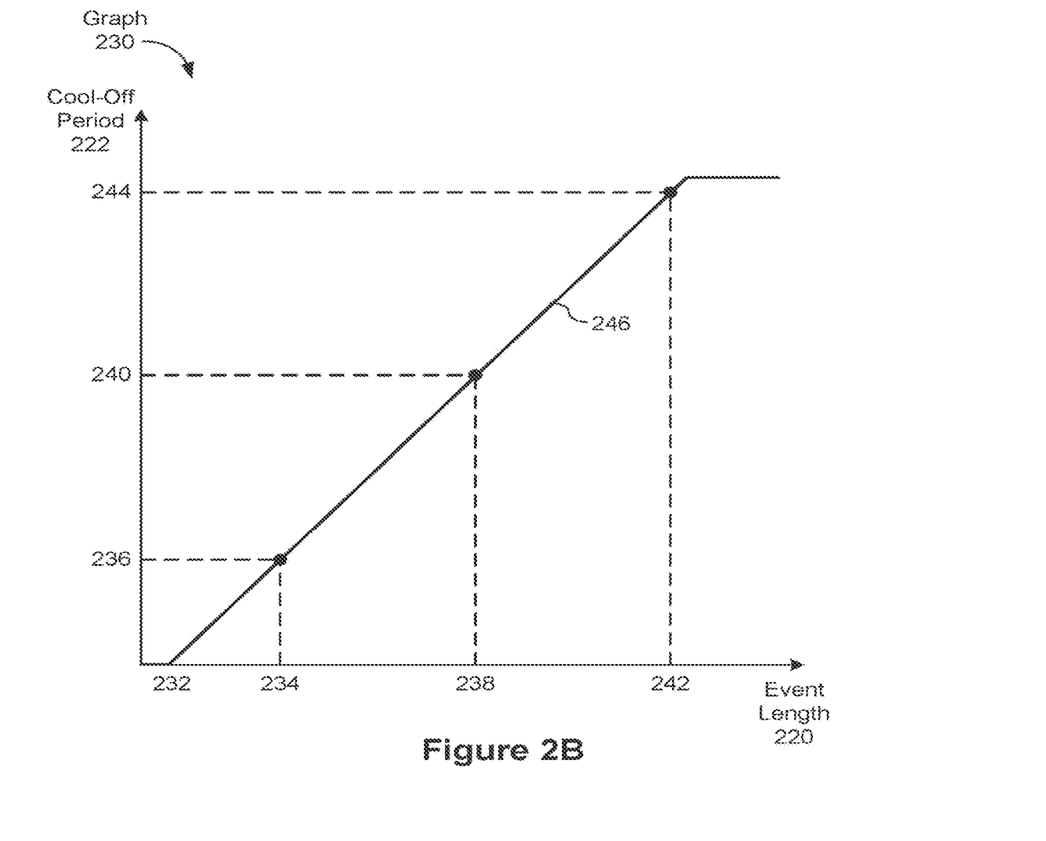
FIG. 2B is a graph depicting cool-off periods versus event length in accordance with some implementations.

FIGS. 2A and 2B describe an event detection scenario 200 in accordance with some implementations. The event detection scenario 200 describes an example scenario in which a camera device 102 performs event-based recording. Referring to FIG. 2A, a low-power motion sensor 112 detects motion in its field of view at time 202 and communicates the detection to the processing circuitry 108. As a result of the motion detection, the processing circuitry 108 enables high-power image processing components of the camera device 102 (e.g., an image processor included in the processing circuitry 108) to analyze image data recorded by the image sensor 114. In some implementations, the processing circuitry 108 does not enable the high-power image processing components until motion has been detected for a threshold amount of time and/or until a threshold amount of motion has been detected. Alternatively, the processing circuitry 108 enables the high-power image processing components immediately upon detection of motion. Regardless of the implementation, motion detected by a low-power motion sensor causes high-power image processing components to be enabled.

The high-power image processing components perform person and/or object recognition, and at time 204 a person or object of interest is detected in the field of view of the image sensor 114 (or a designated area or zone within the field of view). In some implementations, this detection marks the beginning of an event. Alternatively, the event begins when the image processor 112 is enabled, regardless of whether a person or object or interest is detected. During the event, the image processing components of the camera device 102 record video data comprising the image data recorded at the image sensor 114. In some implementations, the recorded video is stored in local memory 106 for future retrieval. In some implementations, the recorded video is transmitted, via high-power communication circuitry 110, through one or more communication networks 120 to a server system 130 and/or a mobile device 140. In some implementations, the transmitting (also referred to herein as streaming) of the video data is contemporaneous with the event-based recording of the video data (e.g., upon detection of a person or object of interest). In some implementations, the camera device 102 stores video for a number of events and then transmits the stored video data intermittently (e.g., to a server system 130) to conserve battery power required by such data transmissions.

The detected person or object of interest leaves the field of view of the image sensor 114 (or a designated area or zone within the field of view) at time 206. In some implementations, the processing circuitry 108 ends the event at that time (i.e. ceases recording, analyzing, and/or streaming video data). Alternatively, the processing circuitry may continue the event (i.e., continue recording, analyzing, and/or streaming video data) until a threshold of time has passed since the detected person or object of interest has left or is otherwise absent (the "absence threshold") from the field of view of the image sensor 114 (or a designated area or zone within the field of view). In the example scenario 200, the detected person or object of interest is absent until at least time 208, at which time the absence threshold has been met and the processing circuitry ends the event.

Upon the end of the event at time 208, the high-power image processing and/or communication components are disabled, and a cool-off period 222 begins, thereby allowing the heat generating camera components to cool off to enable better performance of the motion sensor 112. The cool-off period 222 is responsive to the end of the event. In other words, the cool-off period 222 begins as soon as the preceding event ends. To be clear, the beginning of the cool-off period 222 coincides with the heat-generating high-power components of the camera device 102 being disabled (e.g., at time 208 in scenario 200).

During the cool-off period 222, the camera device 102 does not detect motion. As such, the cool-off period 222 is a gap in time during which motion sensing functions of the camera device 102 are disabled or disregarded. In some implementations, the motion sensor 112 is disabled or otherwise kept in a state in which the motion sensor is inactive during the cool-off period 222. Alternatively, the motion sensor 112 remains active, but the processing circuitry 108 ignores, disregards, or otherwise does not act on motion detection data from the motion sensor during the cool-off period 222. At the end of the cool-off period 222, the motion sensor 112 is re-enabled (if the motion sensor was disabled during the cool-off period), or data from the motion sensor 112 is no longer disregarded by the processing circuitry 108 (if the motion sensor remained enabled during the cool-off period).

Since the camera device 102 cannot detect motion events during the cool-off period 222, the cool-off period 222 should not be longer than it needs to be in order to ensure accurate motion detection results. As such, the length of the cool-off period 222 is variable. In some implementations, the length of the cool-off period 222 is based on the length of the preceding event (referred to herein as event length 220). For example, referring to FIG. 2B, event lengths 234, 238, and 242 require or are otherwise associated with cool-off period lengths 236, 240, and 244, respectively. In some implementations, an event may have a length 232 that does not require a cool-off period 222 (e.g., because such a short event may not have generated enough heat to affect sensitivity of the motion sensor 112). In some implementations, a maximum cool-off period may be determined such that events beyond a threshold length are associated with the maximum cool-off period, regardless of how much longer an event is compared to the threshold length. In some implementations, an interpolated function 246 may be derived based on several event length/cool-off period relationships. As a result of variable cool-off periods, shorter events can have shorter cool-off periods, allowing the motion sensor 112 to regain its original effectiveness quickly.

The interpolated function 246 is one example of a cool-off function (defined as a formula describing the relationship between event length 220 and cool-off period 222). Since cool-off periods tend to increase as event lengths increase, at least part of the cool-off function is positively correlated. Stated another way, at least part of the event length 220 is positively correlated with the cool-off period 222. While the example function 246 fits to an increasing line, cool-off functions may be modeled by any linear or nonlinear function as long as the function is an increasing function (i.e., a function with equal or increasing outputs (y-values) for increasing inputs (x-values)). Stated another way, an increasing function can have flat portions (such as the flat portion between the origin and event length 232 and the flat portion slightly to the right of event length 242 in FIG. 2B) and increasing portions (such as the portion between event lengths 232 and 242 in FIG. 2B), but never decreasing portions. An increasing function may also be described as an increasing function of the first time duration. More specifically, a function y=f(x) is an increasing function if, for any $x_1$ and $x_2$, when $x_1 < x_2$, then $f(x_1) \leq f(x_2)$. With reference to the graph 230 in FIG. 2B, the event lengths 220 are the x values, and the cool-off periods 222 are the y values.

Figure 2C:
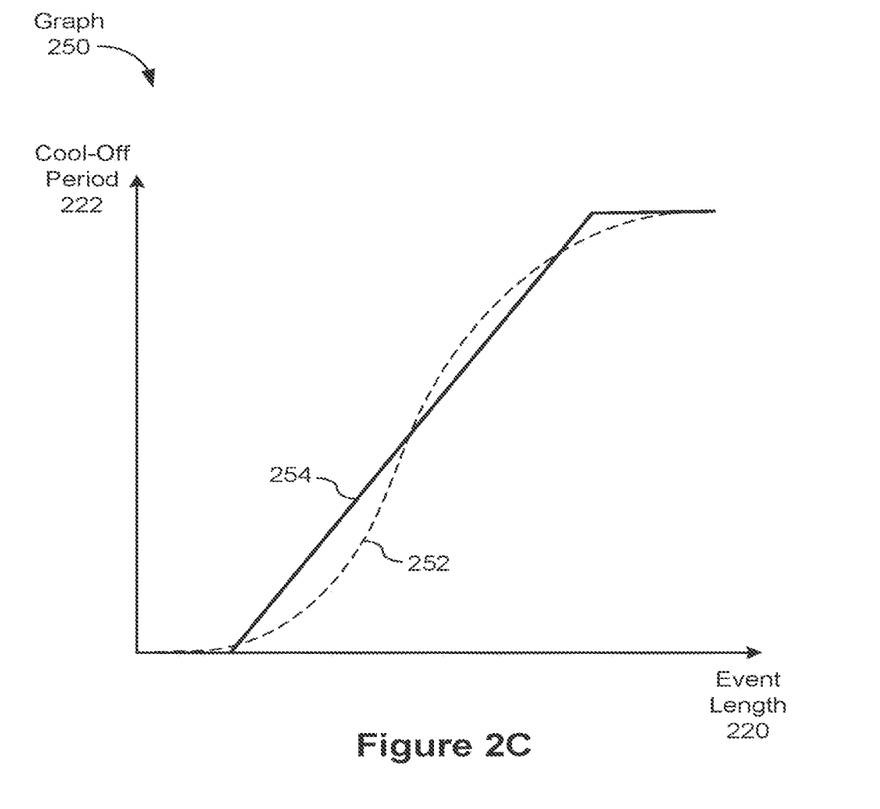
FIG. 2C is a graph depicting cool-off periods versus event length in accordance with some implementations.

Another example cool-off function is depicted in FIG. 2C (graph 250). In this example, a nonlinear function 252 represents the relationship between event lengths 220 and cool-off periods 222 as described above with reference to FIGS. 2A-2B. Shorter event lengths correspond with very low cool-off periods due to, for example, a delay between the time high-power components are enabled and the time they heat up to a level that negatively affects motion detection accuracy. As event lengths continue to grow in duration, cool-off periods also rise. Eventually, the cool-off periods corresponding to very high event lengths taper off due to either a temperature ceiling (e.g., the high-power components do not emit heat above a particular temperature) or a predetermined threshold (e.g., limiting the cool-off period to a particular duration, regardless of the temperature or sensitivity of the motion sensor). To simplify the processing complexity, the processing circuitry may use an approximated function 254 for determining cool-off periods based on event lengths.

As described above, in some implementations, the cool-off function is specific to a particular camera device 102 and reflects that camera's overall heating profile while processing events of particular durations and sensitivity of the motion sensor to such heating. In some implementations, the cool-off function depends on the heating profile of each high-power component and/or the heating profile of various combinations of components. A component's heating profile is defined as the temperature of the component versus the amount of time it is enabled. In other words, as the component is functioning (e.g., while an image processor is processing image data, or while a transceiver is transmitting video data), the component heats up, causing the temperature in proximity to the component to also rise. Since various products and heat-generating components have different heating profiles, a person having ordinary skill in the art would recognize that the specific cool-off function for a given camera device will depend on the specific heating profiles of the camera device's components.

In some implementations, the cool-off function depends on the sensitivity of the motion sensor 112 to heat. The more sensitive the motion sensor, the longer the cool-off period.

In some implementations, the level of sensitivity of the motion sensor 112 is spatially dependent. Specifically, motion sensors may have different sensitivities in different areas of the field of view. As such, cool-off functions can be modeled such that sensitivity in a particular area of the field of view (e.g., the center of the field of view) is low enough to ensure accurate motion detection results in that particular area of the field of view, even if other areas of the field of view are still too sensitive.

In some implementations, the level of sensitivity of the motion sensor depends on the motion detection algorithm. Some algorithms are more sensitive than others and/or some algorithms may allow for a reduced cool-off time.

In some implementations, the level of sensitivity of the motion sensor 112 depends on the size and distance of the object in the field of view. Specifically, even if a motion sensor is not cool enough to detect small objects, the motion sensor may be cool enough to detect larger objects. As such, the cool-off period may be adjusted based on a predetermined object type or size whose detection by the sensor is prioritized (e.g., cars may be detectable at a certain temperature while people or animals may not).

In some implementations, the cool-off function is empirically determined. For example, a single equation may be interpolated from a distribution of temperature data taken from a plurality of image sensors (or any other type of high-power component). The single equation represents a generic image sensor of the type that was used to derive the distribution. Since different types of components have different temperature profile tolerances, the component type may be a factor in determining the cool-off function. For example, if a plurality of transceivers of a particular type are associated with a wide range of empirically determined heating profiles, then the particular type of transceiver has a high distribution sensitivity, and the cool-off function may be adjusted to account for this. In addition or as an alternative to empirical data, cool-off functions may be determined using heating simulations (e.g., based on different combinations of components with known heating profiles being enabled and disabled with different timing). In some implementations, the cool-off function is represented as a cool-off table of event lengths and corresponding cool-off periods stored in the camera memory 106, which is read out by the camera processing circuitry 108 based on the most recent event duration in order to determine the applicable cool-off period. In some implementations, for speedy readout, the cool-off table is structured as a hash table where the applicable cool-off period is read out using a hash of the most recent event length.

Referring back to FIG. 2A, at the end of the cool-off period 222 (time 210), the motion sensor 112 is re-enabled (if the motion sensor was disabled during the cool-off period), or motion detection data from the motion sensor 112 is no longer disregarded (if the motion sensor was not disabled during the cool-off period). As such, the camera device 102 can rely on the motion sensor 112 to accurately detect motion events.

Event Detection Processes

Figure 3:
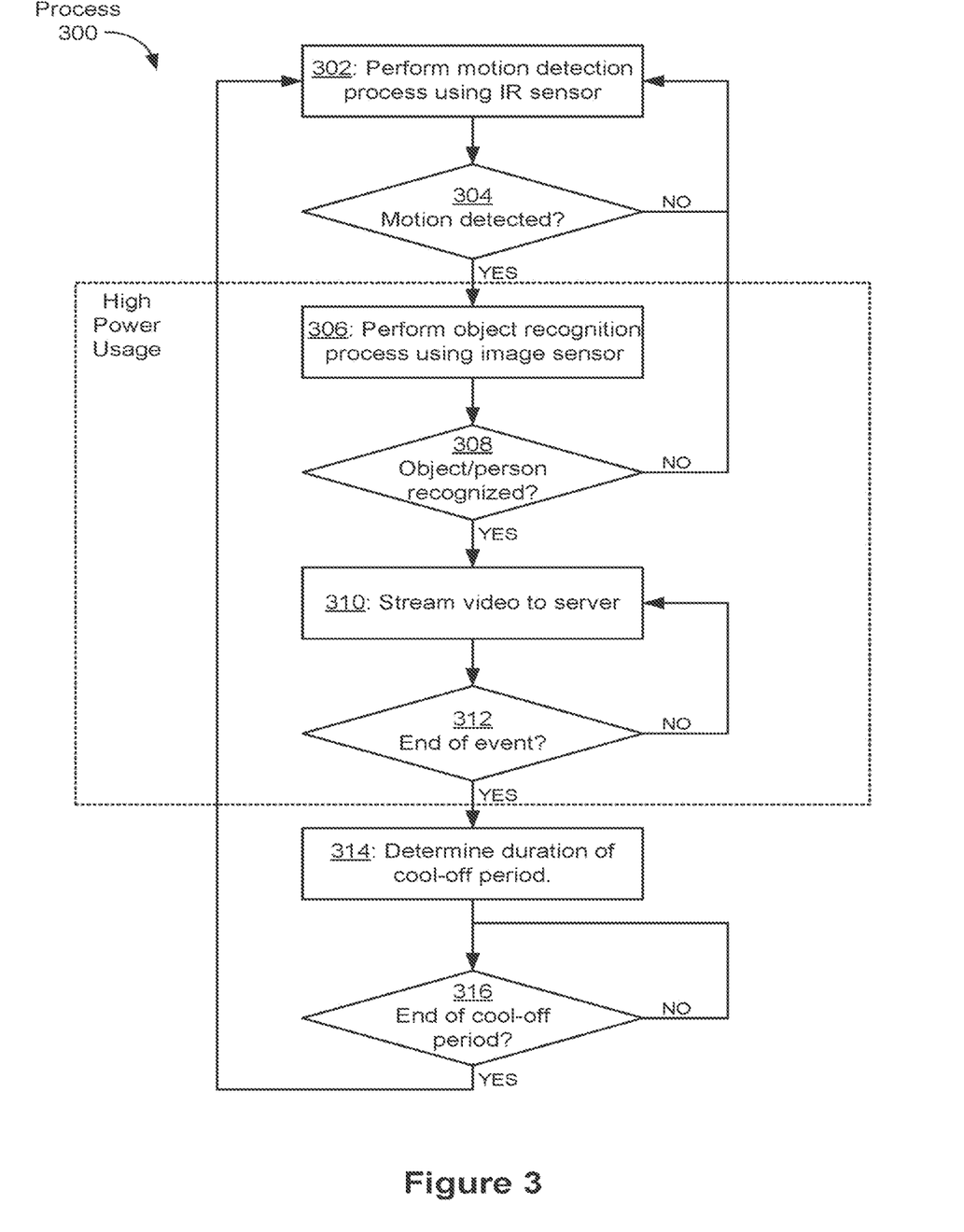
FIG. 3 is a flowchart of an event detection process in accordance with some implementations.

FIG. 3 is a flow diagram illustrating an example process 300 for detecting events at a camera device 102 in a way that balances power conservation with detection accuracy. Process 300 is, optionally, governed by instructions that are stored in a computer memory or non-transitory computer readable storage medium (e.g., memory 106 in FIG. 1) and that are executed by one or more processors of the camera device 102 (e.g., processing circuitry 108). The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in process 300 may be combined and/or the order of some operations may be changed.

A camera device (e.g., 102 in FIG. 1) performs (302) motion detection using a low-power motion sensor 112 (e.g., a PIR sensor). If no motion is detected (304-no), the camera device continues to perform motion detection. Upon detection of motion in a field of view (e.g., 116, FIG. 1) (304-yes), the camera device enables one or more high-power components to perform more complicated processing. For example, the camera device enables high-power components for processing of video data corresponding to the field of view (e.g., 118, FIG. 1) in which motion was detected by powering up or otherwise activating image processing circuitry (e.g., image sensor 114 and image processing elements of processing circuitry 108).

The camera device performs (306) an object recognition process using the image sensor 114. This coincides with the beginning of an event, as described above with reference to FIG. 2A (time 204). If an object or person of interest is not recognized (308-no) within a threshold amount of time, the event is finished and the process returns to operation 302. If an object or person of interest is recognized (308-yes), the camera device streams (310) video data, via high-power communication circuitry 110, to an external electronic device (e.g., a server system 130 and/or a mobile device 140). The camera device continues to stream video data as long as the event is not finished (312-no), or until a maximum event length has been reached. If the maximum event length has been reached, or if the object or person of interest is absent, this marks the end of the event (312-yes), as described above with reference to FIG. 2A (time 208). The length of the event is referred to herein as a first time duration.

Upon the end of the event, the camera device powers down the high-power components (e.g., the image sensor 114 and communication circuitry 110) and determines (314) the duration of a cool-off period for the low-power motion sensor. The duration of the cool-off period is referred to herein as a second time duration. The camera device determines the cool-off period as described above with reference to FIGS. 2A-2C. During the cool-off period (316-no), either the motion sensor remains disabled, or the motion sensor remains enabled but the camera device disregards motion detections. At the end of the cool-off period (316-yes), the process returns to operation 302, at which time the motion sensor is re-enabled (or motion detection data is no longer disregarded).

The operations that take place during an event (306-312) require high-power, and therefore, the components that implement these operations only function on an as-needed basis, as described above with reference to FIGS. 1 and 2A-2C.

Figure 4:
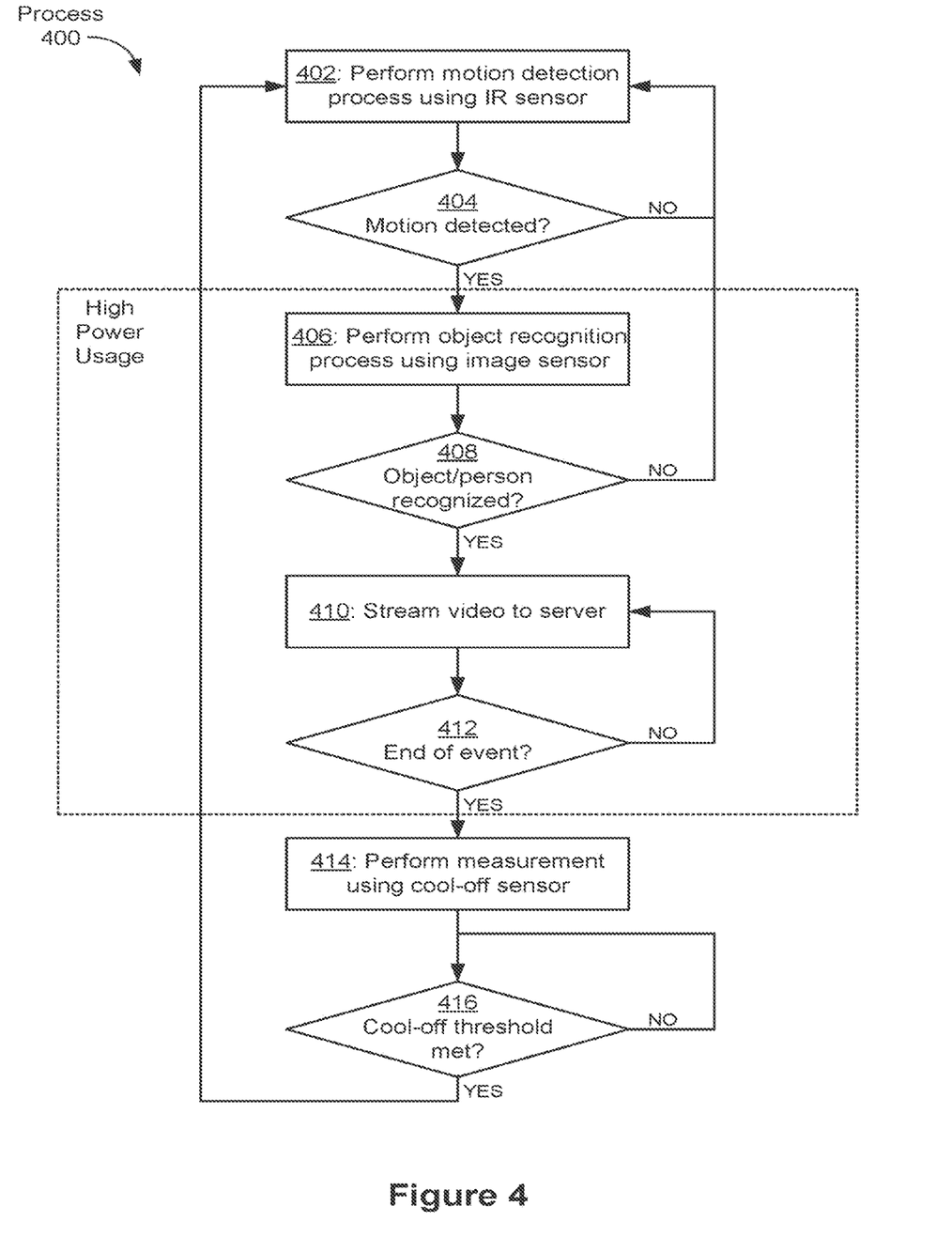
FIG. 4 is a flowchart of an event detection process in accordance with some implementations.

FIG. 4 is a flow diagram illustrating an example process 400 for detecting events at a camera device 102 in a way that balances power conservation with detection accuracy. Process 400 is, optionally, governed by instructions that are stored in a computer memory or non-transitory computer readable storage medium (e.g., memory 106 in FIG. 1) and that are executed by one or more processors of the camera device 102 (e.g., processing circuitry 108). The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in process 400 may be combined and/or the order of some operations may be changed.

Operations 402-412 correspond to operations 302-312 (FIG. 3), and are not further described here for purposes of brevity. Upon the end of the event, the camera device powers down the high-power components (e.g., the image sensor 114 and communication circuitry 110) and enters a cool-off period as described above. However, while process 300 (FIG. 3) determines the duration of the cool-off period based on temporal indicators of motion sensor sensitivity (e.g., event length), process 400 determines the duration of the cool-off period based on more direct indicators of motion sensor sensitivity (e.g., temperature measurements). As such, the camera device performs (414) measurements using a cool-off sensor (e.g., a temperature sensor 111 in proximity to the motion sensor). If a predetermined cool-off threshold is not met (416-no), the camera device continues to perform measurements using the cool-off sensor. During this cool-off period, either the motion sensor remains disabled, or the motion sensor remains enabled but the camera device disregards motion detections. When the cool-off threshold is met (e.g., the temperature in proximity to the motion sensor drops below a threshold) (416-yes), the process returns to operation 402, at which time the motion sensor is re-enabled (or motion detection data is no longer disregarded).

In some implementations, the cool-off sensor is a temperature sensor 111 in proximity to the motion sensor. The temperature sensor measures an ambient temperature in proximity to the camera device 102. In some implementations, the temperature sensor only functions when motion is detected. In some implementations, the camera device 102 communicates (e.g., using the communication circuitry 110) with a networked weather conditions database and determines, based on the camera's installed location, an ambient temperature in a neighborhood of the camera device. The ambient temperature is correlated with the motion sensor temperature. The processing circuitry interprets temperature measurements from the temperature sensor (or temperature readings from external sources) as temperature readings of the motion sensor. When the temperature returns to a baseline or threshold level corresponding to a desired sensitivity level of the motion sensor, the cool-off period ends and the motion sensor is re-enabled (or motion detection data is no longer disregarded).

In some implementations, the cool-off sensor is a light sensor (or any type of IR sensor with sensitivity to heat, such as a photodiode) included in or otherwise in proximity to the camera device. The light sensor is correlated with motion sensor sensitivity. When a heat intensity or energy level sensed by the light sensor returns to a baseline or threshold level corresponding to a desired sensitivity level of the motion sensor, the cool-off period ends and the motion sensor is re-enabled (or motion detection data is no longer disregarded).

While the implementations described herein use a motion sensor (e.g., a PIR sensor) as an example of a low-power electronic component that is sensitive to heat, the concepts described herein apply to other components with similar power requirements and heat sensitivities. Examples include quantum photodiodes, proximity sensors, temperature-humidity sensors, thermopiles, infrared cameras, and the like. Any electronic component that requires relatively low power but is negatively affected by heat can be subjected to a dynamic cool-off period, based on the amount of heat proximate to the low-power component, and/or based on the amount of time high-power components are functioning before being disabled.

In some implementations, the duration of the cool-off period (e.g., in operation 314) and/or the value of the cool-off threshold (e.g., in operation 416) are further based on a mode of operation of the camera device. For example, the camera device may operate in a mode favoring shorter cool-off periods (thereby decreasing false negative motion detection results while the motion sensor is not being used) at a cost of motion detection accuracy at the end of the cool-off period (false positive motion detection results due to relatively high temperatures). On the other hand, the camera device may operate in a mode favoring increased motion detection accuracy at the end of the cool-off period (fewer false positive motion detection results due to relatively low temperatures) at a cost of longer cool-off periods (thereby increasing false negative motion detection results while the motion sensor is not being used). The differences in these two modes involves a balance of false negative and false positive motion detection results. As such, specific settings for each mode depend on the application and/or user preferences. For example, if a user receives too many false positive motion detection results from a particular camera device setup, the user may adjust the operating mode of the camera device such that cool-off periods are longer, and vice versa.

In some implementations, the duration of the cool-off period (e.g., in operation 314) is further based on one or more temperature readings of components in proximity to the motion sensor. The camera device (e.g., processing circuitry 108) may obtain a first temperature reading at the beginning of a high power usage event (e.g., at time 204 in FIG. 2A, upon commencing operation 306 in FIG. 3). The camera device (e.g., processing circuitry 108) may additionally or alternatively obtain a second temperature reading at the end of a high power usage event (e.g., at time 208 in FIG. 2A, upon commencing operation 314 in FIG. 3). The temperature readings may be obtained from a thermistor mounted to a circuit board shared with or otherwise in proximity to the motion sensor. The temperatures at the beginning and/or end of the high power usage event may have an impact on how quickly or slowly heat dissipation takes place and/or how much noise is introduced to motion sensor readings. As such, the duration of the cool-off period 222 may be influenced by (i) the event length, and (ii) one or both of the first and second temperature readings. For example, referring to FIG. 2A, higher temperature readings at time 204 and/or time 206 may result in a longer cool-off period 222. As a further example, temperature readings at time 204 and/or time 206 may influence the slope of at least part of the cool-off function (e.g., function 246 in FIG. 2B, function 254 in FIG. 2C). Specifically, higher temperature readings at time 204 and/or time 206 may cause the slope of at least part of the cool-off function to increase.

In some implementations, the processing circuitry 108 updates the cool-off function or table based on performance of the camera device 102 given the initially installed settings. For example, if a particular camera device 102 is hotter than normal, then the cool-off function or table can be modified to account for the hotter temperatures (e.g., by increasing the cool-off periods for corresponding event lengths).

System Diagram

Figure 5:
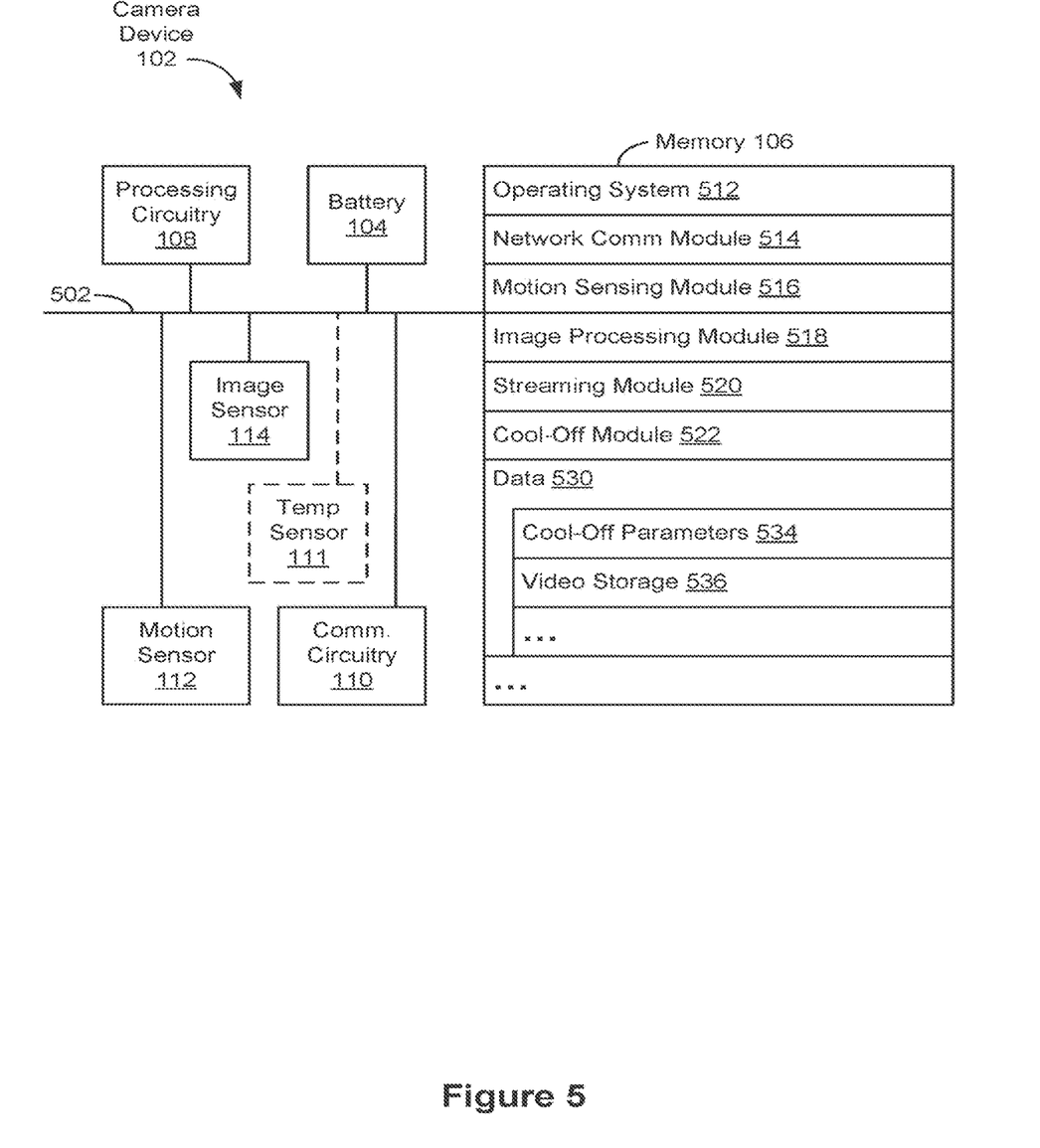
FIG. 5 is a block diagram illustrating certain components of an example camera device in accordance with some implementations.

FIG. 5 is a block diagram illustrating certain components of an example camera device 102 in accordance with some implementations. Components corresponding to those in FIG. 1 are similarly numbered and are not further described here for purposes of brevity. The camera device 102 includes a battery 104, memory 106, processing circuitry 108 (e.g., processing unit(s)), communication circuitry 110 (e.g., network interface(s)), an optional temperature sensor 111, a motion sensor 112, an image sensor 114, and one or more communication buses 502 for interconnecting these components.

Memory 106 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 106, optionally, includes one or more storage devices remotely located from one or more processing units of processing circuitry 108. Memory 106, or alternatively the non-volatile memory within memory 106, includes a non-transitory computer readable storage medium. In some implementations, memory 106, or the non-transitory computer readable storage medium of memory 106, stores the following programs, modules, and data structures, or a subset or superset thereof:

Operating system 512 including procedures for handling various basic system services and for performing hardware dependent tasks;

Network communication module 514 for connecting the camera device 102 to other devices (e.g., server system 130 or mobile device 140) via one or more network interfaces of the communication circuitry 110 (wired or wireless) and one or more networks 120, such as the Internet, other wide area networks, local area networks, metropolitan area networks, and so forth;

Motion sensing module 516 for operating the motion sensor 112 to perform motion detection;

Image processing module 518 for operating the image sensor 114 to process image/video data, including recording and person/object detection processes;

Streaming module 520 for compressing the image/video data and transmitting the image/video data to one or more external devices using the communication circuitry 110;

Cool-off module 522 for determining the duration of cool-off periods as described above with reference to FIGS. 1-4; and Data 530, including:
Cool-off parameters 534 such as (i) event length vs. cool-off period functions as described above with reference to FIGS. 2A-2C for determining cool-off period lengths, and/or (ii) cool-off threshold vs. cool-off period relationships as described above with reference to operations 414-416 in FIG. 4. The cool off parameters 534 can be a function or a table and can represent a model based on one or more of the factors discussed above (e.g., prioritized object type, spatial sensitivity of the motion sensor, and so forth).

Video storage 536 for storing image/video data recorded by the image sensor 114.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 106, optionally, stores a subset of the modules and data structures identified above. Furthermore, memory 106, optionally, stores additional modules and data structures not described above.

Dual Motion Sensors

In the implementations above, the camera device 102 includes a single low-power motion sensor 112 that is subject to a cool-off period, during which readings from the motion sensor are disregarded (or the motion sensor itself is powered down). Alternatively, the camera device 102 may include a supplementary motion sensor for use while the primary motion sensor (low-power motion sensor 112) is powered down or otherwise being disregarded during the cool-off period.

In some implementations, the supplementary motion sensor may use an alternative motion sensing technology that is not as susceptible to high temperatures as, for example, a PIR sensor. Examples include active motion sensors such as microwave sensors (i.e., radar), acoustic sensors (i.e., sonar), or optical sensors. Active motion sensors typically use more power than low-power motion sensors such as PIR sensors, so in these implementations, the supplementary active motion sensor is powered down until the beginning of the cool-off period, at which time the supplementary active motion sensor performs motion detection until the primary low-power motion sensor is ready to be used (e.g., at time 210, FIG. 2A). When the low-power motion sensor is ready to be used, the supplementary active motion sensor is powered back down in order to save power. Stated another way, during a cool-off period, while the low-power motion sensor is deactivated or disregarded, the active sensor can be brought online as the primary motion sensor until the low-power motion sensor is ready for normal operation at the end of the cool-off period.

In some implementations, the supplementary motion sensor may be a second low-power motion sensor (e.g., a second PIR sensor). Compared to the location of the primary low-power motion sensor 112, the supplementary low-power motion sensor may be placed in a substantially different area of the camera device 102 such that its sensitivity to heat is not impacted to the same degree as that of the primary low-power motion sensor. As such, during a cool-off period, while the primary motion sensor is deactivated or disregarded, the supplementary motion sensor may be brought online until the primary motion sensor is ready for normal operation at the end of the cool-off period.

In some implementations, the supplementary motion sensor may be a second motion sensor, and both motion sensors may be used during motion detection operations (302 in FIG. 3, 402 in FIG. 4). For example, both motion sensors may be low-power PIR sensors. Alternatively, one motion sensor may be a pyroelectric PIR sensor, and the other motion sensor may be a quantum photodiode. Multiple motion sensors may cover a wider field of view (116, FIG. 1), which results in additional motion information that can be useful in determining whether a person or object is approaching or moving away from the camera device. The camera device uses this information in determining whether to turn on high-power components (e.g., operation 306 in FIG. 3, operation 406 in FIG. 4). For example, if the motion detected in operation 304 (FIG. 3) or operation 404 (FIG. 4) is determined to be associated with movement toward the camera device, processes 300 and 400 proceed to high power usage operations. On the other hand, if the detected motion is determined to be associated with movement away from the camera device, processes 300 and 400 do not proceed to high power usage operations.

Miscellaneous

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Additionally, it will be understood that, although the terms "first," "second," etc. may be used herein to describe various elements, these elements should not be limited by these terms. These terms are only used to distinguish one element from another.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

The above description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:
1. A method comprising:
  detecting, via a motion sensor, motion in a first field of view of an image-capture device;
  capturing, in response to the motion being detected and via an image sensor of the image-capture device, one or more frames of a second field of view for a first time duration, the second field of view including at least portions of the first field of view;
  processing, in response to capturing the one or more frames and at processing circuitry, the one or more frames of the second field of view for a second time duration; and setting a cool-off period for the motion sensor during which the processing circuitry either does not receive or disregards sensor data from the motion sensor, the cool-off period having a third time duration based on at least one of the first time duration or the second time duration.

2. The method of claim 1, further comprising:
determining, via one or more temperature sensors, a temperature within the image-capture device.

3. The method of claim 2, further comprising:
in accordance with a determination that the temperature is less than a threshold temperature, ending the cool-off period for the motion sensor to enable the motion sensor to detect motion in the first field of view.

4. The method of claim 2, further comprising:
in accordance with a determination that the temperature is greater than a threshold temperature, extending the cool-off period for the motion sensor.

5. The method of claim 1, further comprising:
detecting, via the motion sensor and after an expiration of the third time duration, subsequent motion in the first field of view of the image-capture device;
capturing, in response to subsequent motion being detected and via the image sensor of the image-capture device, one or more additional frames of the second field of view for a fourth time duration;
processing, in response to capturing the one or more additional frames and at the processing circuitry, the one or more additional frames of the second field of view for a fifth time duration; and
setting an additional cool-off period for the motion sensor during which the processing circuitry either does not receive or disregards sensor data from the motion sensor, the cool-off period having a sixth time duration based on at least one of the fourth time duration or the fifth time duration.

6. The method of claim 5, wherein the sixth time duration is greater or less than the third time duration.

7. The method of claim 1, further comprising:
determining an ambient temperature surrounding the image-capture device, and wherein the third time duration is further based on the ambient temperature.

8. The method of claim 1, wherein:
the third time duration is further based on a mode of operation of the image-capture device; and
a first interval of time of the third time duration for a first mode of the image-capture device is less than a second interval of time of the third time duration for a second mode of the image-capture device.

9. The method of claim 1, further comprising:
streaming the one or more captured frames to an electronic device external to the image-capture device.

10. The method of claim 1, further comprising:
detecting, at the processing circuitry, an object of interest in the second field of view.

11. The method of claim 10, further comprising:
recognizing, responsive to the detection and based on the processing of the one or more captured frames, the object of interest in the second field of view.

12. The method of claim 11, wherein the processing of the one or more frames is in response to the recognition of the object of interest in the second field of view.

13. The method of claim 11, further comprising:
storing, responsive to and in accordance with the recognition of the object of interest in the second field of view, the one or more frames.

14. The method of claim 10, further comprising:
detecting that the object of interest has been absent from the first field of view for a threshold amount of time.

15. The method of claim 14, further comprising:
ceasing of the processing of the one or more frames in accordance with the detecting that the object of interest has been absent from the field of view for the threshold amount of time.

16. The method of claim 1, wherein the motion sensor is a passive infrared sensor, and wherein a level of sensitivity of the passive infrared sensor depends on at least one of a size or a distance of an object whose motion is detected in the first field of view.

17. The method of claim 16, wherein the third time duration is further based on a determined type or size of the object whose motion is detected by the motion sensor.

18. The method of claim 1, further comprising:
detecting, during the cool-off period, motion in a third field of view using a supplementary sensor; and
deactivating the supplementary sensor upon expiration of the third time duration.

19. The method of claim 1, wherein the first field of view and the second field of view are substantially similar.

20. The method of claim 1, further comprising:
deactivating, responsive to setting the cool-off period, at least one of the image sensor or communication circuitry.

* * * * *